(12) United States Patent
Asaumi et al.

(10) Patent No.: US 10,877,002 B2
(45) Date of Patent: Dec. 29, 2020

(54) ULTRASONIC FLAW DETECTION DEVICE AND ULTRASONIC FLAW DETECTION METHOD

(71) Applicant: IHI CORPORATION, Tokyo (JP)

(72) Inventors: Yuto Asaumi, Tokyo (JP); Hiroaki Hatanaka, Tokyo (JP); Shigeki Sakakura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 237 days.

(21) Appl. No.: 16/038,249

(22) Filed: Jul. 18, 2018

(65) Prior Publication Data

US 2018/0321196 A1 Nov. 8, 2018

Related U.S. Application Data

(63) Continuation of application No. PCT/JP2017/004748, filed on Feb. 9, 2017.

(30) Foreign Application Priority Data

Feb. 10, 2016 (JP) ................................. 2016-023312

(51) Int. Cl.
*G01N 29/22* (2006.01)
*G01N 29/26* (2006.01)
(Continued)

(52) U.S. Cl.
CPC ........... *G01N 29/221* (2013.01); *G01N 29/04* (2013.01); *G01N 29/041* (2013.01);
(Continued)

(58) Field of Classification Search
CPC ...... G01N 29/22; G01N 29/24; G01N 29/221; G01N 29/26; G01N 29/36
(Continued)

(56) References Cited

U.S. PATENT DOCUMENTS 3,332,278 A 7/1967 Wood
3,349,607 A * 10/1967 Klindt ................ G01N 29/2487
73/600

(Continued)

FOREIGN PATENT DOCUMENTS

FR 2 997 191 A1 4/2014
JP S52-112371 A 9/1977
(Continued)

OTHER PUBLICATIONS

The International Bureau of WIPO, "International Preliminary Report on Patentability," received for PCT Application No. PCT/JP2017/004748 dated Aug. 23, 2018, 7 pages.

(Continued)

*Primary Examiner* — Benjamin R Schmitt

(57) ABSTRACT

Provided is an ultrasonic flaw detection device including: a transmission window; a transmission probe, which is configured to transmit an ultrasonic beam from the transmission window toward a range required to be inspected, which is set in advance, of an inspection surface of an object to be inspected; a reception window, which is arranged in a relationship with respect to the transmission window in which an ultrasonic wave that has been reflected outside the range required to be inspected is inhibited from reaching the reception window; and a reception probe, which is configured to receive an ultrasonic wave that has passed through the reception window.

5 Claims, 5 Drawing Sheets

(51) Int. Cl.
*G01N 29/04* (2006.01)
*G01N 29/24* (2006.01)
*G01S 7/527* (2006.01)
*G01S 15/02* (2006.01)

(52) U.S. Cl.
CPC ........... *G01N 29/043* (2013.01); *G01N 29/24* (2013.01); *G01N 29/26* (2013.01); *G01S 7/527* (2013.01); *G01S 15/02* (2013.01); *G01N 2291/0289* (2013.01); *G01N 2291/044* (2013.01); *G01N 2291/102* (2013.01); *G01N 2291/267* (2013.01)

(58) Field of Classification Search
USPC ........................... 73/584, 596, 609, 617, 632
See application file for complete search history.

(56) References Cited

U.S. PATENT DOCUMENTS

| | | |
|---|---|---|
| 3,552,191 A | 1/1971 | Heseding |
| 4,012,946 A | 3/1977 | Patsey |
| 4,137,779 A | 2/1979 | Wustenberg |
| 2009/0151457 A1 | 6/2009 | Iizuka |
| 2013/0291640 A1 | 11/2013 | Rasselkorde et al. |

FOREIGN PATENT DOCUMENTS

| | | |
|---|---|---|
| JP | H09-297125 A | 11/1997 |
| JP | 2001-235450 A | 8/2001 |
| JP | 2004-138392 A | 5/2004 |
| JP | 2004-347572 A | 12/2004 |
| JP | 2007-163470 A | 6/2007 |
| JP | 2007-187631 A | 7/2007 |
| JP | 2008-164396 A | 7/2008 |
| JP | 4437656 B2 | 3/2010 |
| JP | 2011-247676 A | 12/2011 |
| JP | 2013-234886 A | 11/2013 |

OTHER PUBLICATIONS

Japan Patent Office, "Notice of Reasons for Refusal," issued in Japanese Patent Application No. 2016-023312, which is a Japanese counterpart of U.S. Appl. No. 16/038,249, dated Oct. 8, 2019, 9 pages (5 pages of English translation of Office Action and 4 pages of original Office Action).

International Search Report received for PCT Patent Application No. PCT/JP2017/004748 dated Apr. 11, 2017, 2 pages (1 page of English translation of International Search Report, and 1 page of International Search Report).

Written Opinion of the International Searching Authority received for PCT Patent Application No. PCT/JP2017/004748 dated Apr. 11, 2017, 4 pages.

European Patent Office, Office Communication, issued in European Patent Application No. 17 750 334.9, which is a European counterpart of U.S. Appl. No. 16/038,249, dated Nov. 9, 2018, 5 pages.

European Patent Office, "Supplementary European Search Report," issued in European Patent Application No. 17 750 334.9, which is a European counterpart of U.S. Appl. No. 16/038,249, dated Sep. 24, 2018, 4 pages.

Japan Patent Office, "Decision to Grant a Patent," issued in Japanese Patent Application No. 2016-023312, which is a Japanese counterpart of U.S. Appl. No. 16/038,249, dated Jun. 2, 2020, 5 pages (2 pages of English translation of Office Action, and 3 pages of original Office Action).

\* cited by examiner

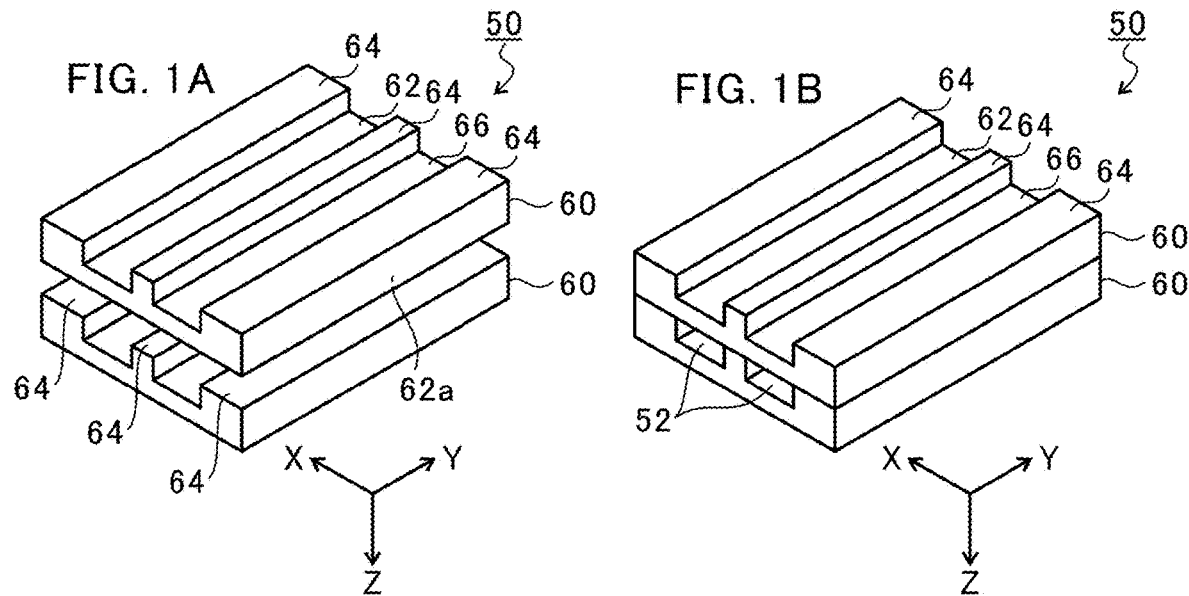
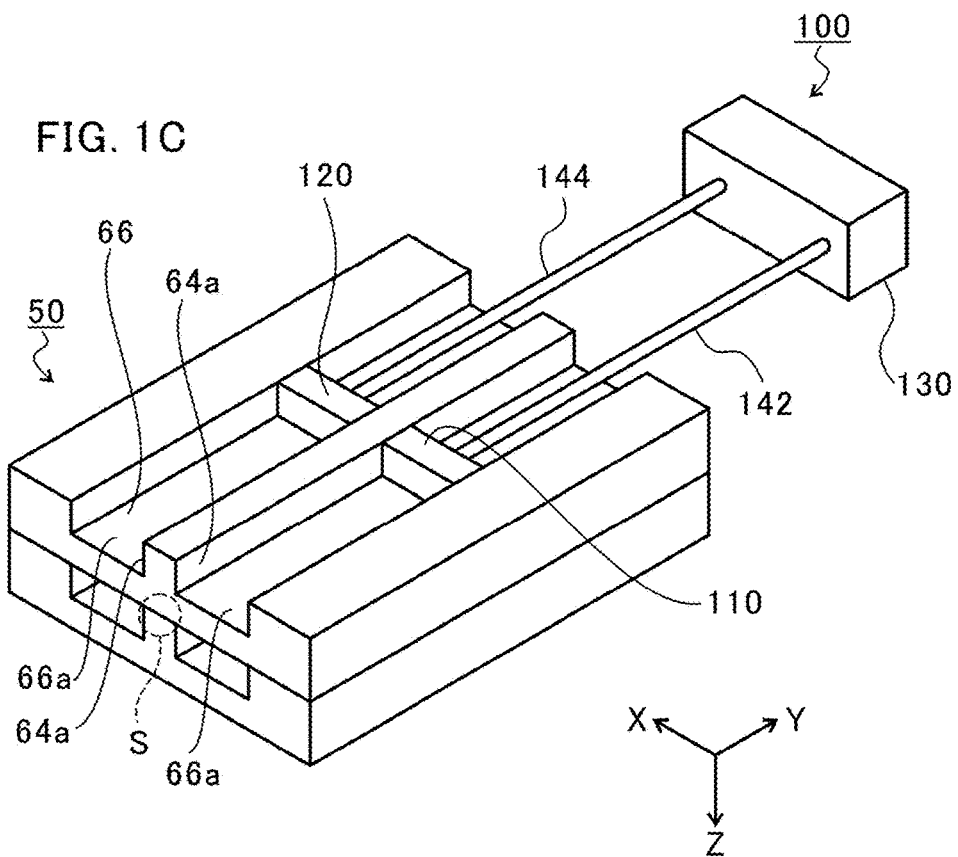

sonic flaw detection device, which is capable of detecting a flaw with high accuracy while suppressing occurrence of noise, and an ultrasonic flaw detection method.

ULTRASONIC FLAW DETECTION DEVICE AND ULTRASONIC FLAW DETECTION METHOD

CROSS REFERENCE TO RELATED APPLICATIONS

This application is a continuation application of International Application No. PCT/JP2017/004748, filed on Feb. 9, 2017, which claims priority to Japanese Patent Application No. 2016-023312, filed on Feb. 10, 2016, the entire contents of which are incorporated by reference herein.

BACKGROUND ART

Technical Field

This disclosure relates to an ultrasonic flaw detection device, which is configured to detect a flaw in an object to be inspected using an ultrasonic wave, and to an ultrasonic flaw detection method.

Related Art

Hitherto, there has been used an ultrasonic flaw detection device to inspect an object to be inspected for defects such as a flaw, a crack, and a joint failure. The ultrasonic flaw detection device includes a transmission probe and a reception probe. The transmission probe is configured to transmit an ultrasonic beam from a transmission window. The reception probe is configured to receive an ultrasonic wave that has passed through a reception window. The ultrasonic flaw detection device is configured to detect presence or absence of a defect, and a position, a size, and the like of the defect by analyzing the ultrasonic wave received by the reception probe.

As the ultrasonic flaw detection device, there has been disclosed, for example, a technology involving holding the transmission probe and the reception probe with a predetermined interval (for example, Patent Literatures 1 and 2). In the technology of each of Patent Literatures 1 and 2, under a state in which the transmission window and the reception window are opposed to an inspection surface of the object to be inspected, the ultrasonic beam is transmitted from the transmission probe to enter the object to be inspected.

CITATION LIST

Patent Literature

Patent Literature 1: Japanese Patent Application Laid-Open No. JP 2013-234886
Patent Literature 2: Japanese Patent No. 4437656

SUMMARY

Technical Problem

As described above, the related-art ultrasonic flaw detection device transmits the ultrasonic wave from the surface that is opposed to the inspection surface, and receives the ultrasonic wave by the opposing surface. Therefore, the related-art ultrasonic flaw detection device can focus an inspectable range only to some extent. The inspectable range is a range of the inspection surface in which the ultrasonic beam radiated from the transmission probe enters, and from which the reflected ultrasonic wave reaches the reception probe. Therefore, when a range to be inspected (hereinafter referred to as "range required to be inspected") of the inspection surface of the object to be inspected is smaller than the inspectable range, the reception probe receives not only an ultrasonic wave that has been reflected from the range required to be inspected but also an ultrasonic wave that has been reflected outside the range required to be inspected. Therefore, the related-art ultrasonic flaw detection device has had a difficulty in detecting a flaw in the range required to be inspected with large noise.

In view of the above problem, this disclosure has an object to provide an ultrasonic flaw detection device, which is capable of detecting a flaw with high accuracy while suppressing occurrence of noise, and an ultrasonic flaw detection method.

Solution to Problem

In order to solve the above problem, according to one embodiment of this disclosure, there is provided an ultrasonic flaw detection device including: a transmission window; a transmission probe, which is configured to transmit an ultrasonic beam from the transmission window toward a range required to be inspected, which is set in advance, of an inspection surface of an object to be inspected; a reception window, which is arranged in a relationship with respect to the transmission window in which an ultrasonic wave that has been reflected outside the range required to be inspected is inhibited from reaching the reception window; and a reception probe, which is configured to receive an ultrasonic wave that has passed through the reception window.

Further, the transmission probe may be formed so that an edge of the ultrasonic beam has an angle at which the edge of the ultrasonic beam reaches an edge on the transmission probe side of the range required to be inspected or an inside of the edge on the transmission probe side of the range required to be inspected, and the transmission window and the reception window may have angles with respect to the inspection surface that establish the relationship in which the ultrasonic wave that has been reflected outside the range required to be inspected is inhibited from reaching the reception window.

Further, the transmission probe may have a first opposing surface portion that is opposed to the inspection surface, and the transmission window may be provided in a side surface portion that is erected from the first opposing surface portion, and the reception probe may have a second opposing surface portion that is opposed to the inspection surface, and the reception window may be provided in a side surface portion that is erected from the second opposing surface portion.

Further, the ultrasonic flaw detection device may further include a medium portion, which is provided between the transmission window and the reception window, and through which an ultrasonic wave is propagated.

Further, the object to be inspected may be at least partially used as the medium portion.

Further, the ultrasonic flaw detection device may further include a determination module, which is configured to determine presence or absence of a flaw in the range required to be inspected based on the ultrasonic wave received by the reception probe.

In order to solve the above problem, according to one embodiment of this disclosure, there is provided an ultrasonic flaw detection method, in which an ultrasonic flaw detection device is used to detect a flaw in a range required to be inspected, which is set in advance, of an inspection surface of an object to be inspected, the ultrasonic flaw detection device including a transmission probe configured to transmit an ultrasonic beam from a transmission window, and a reception probe configured to receive an ultrasonic wave that has passed through a reception window, the ultrasonic flaw detection method including: arranging the transmission probe and the reception probe so that the transmission window and the reception window have a relationship in which an ultrasonic wave that has been reflected outside the range required to be inspected is inhibited from reaching the reception window; and causing the transmission probe to transmit the ultrasonic beam from the transmission window toward the range required to be inspected.

Effects of Disclosure

According to this disclosure, it is possible to detect a flaw with high accuracy while suppressing occurrence of noise.

BRIEF DESCRIPTION OF DRAWINGS

FIG. 1A is a first view for illustrating a mode of use of an ultrasonic flaw detection device.

FIG. 1B is a second view for illustrating the mode of use of the ultrasonic flaw detection device.

FIG. 1C is a third view for illustrating the mode of use of the ultrasonic flaw detection device.

DESCRIPTION OF EMBODIMENT

Figure 2A:
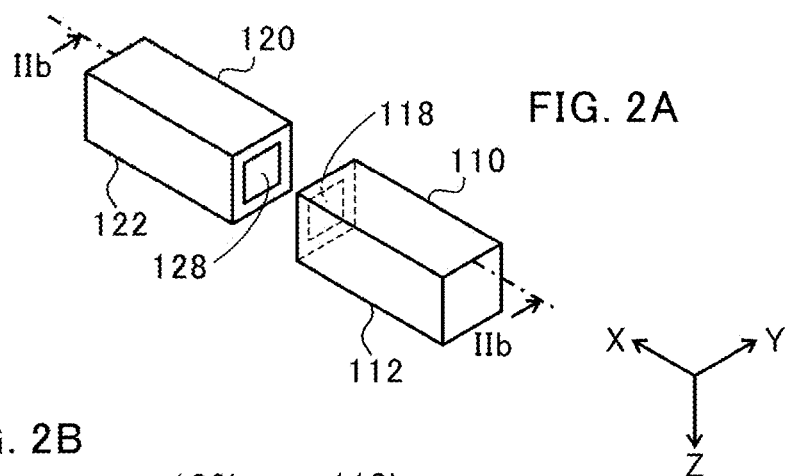
FIG. 2A is a perspective view of a transmission probe and a reception probe.

Now, with reference to the attached drawings, an embodiment of this disclosure is described in detail. The dimensions, materials, and other specific numerical values represented in the embodiment are merely examples used for facilitating the understanding of this disclosure, and do not limit this disclosure otherwise particularly noted. Elements having substantially the same functions and configurations herein and in the drawings are denoted by the same reference symbols to omit redundant description thereof. Further, illustration of elements with no direct relationship to this disclosure is omitted.

<Ultrasonic Flaw Detection Device 100>

FIG. 1A is a first view for illustrating a mode of use of an ultrasonic flaw detection device 100. FIG. 1B is a second view for illustrating the mode of use of the ultrasonic flaw detection device 100. FIG. 1C is a third view for illustrating the mode of use of the ultrasonic flaw detection device 100. In FIG. 1A of an embodiment of this disclosure and the subsequent figures, an X axis (horizontal direction), a Y axis (horizontal direction), and a Z axis (vertical direction), which perpendicularly intersect one another, are defined as illustrated in the figures. Moreover, in this embodiment, as an object to be inspected by the ultrasonic flaw detection device 100, a structure 50 (for example, reactor) is described as an example.

As illustrated in FIG. 1A and FIG. 1B, the structure 50 is formed by stacking partitions 60 each made of a metal. Each of the partitions 60 includes a base plate 62 and ribs 64. The ribs 64 are members that are erected from the base plate 62 and extend in the Y axis direction in FIG. 1A to FIG. 1C. The partitions 60 are bonded to each other by welding, for example, tungsten inert gas (TIG) welding, diffusion bonding, soldering, or the like. In other words, upper surfaces of the ribs 64 and a bottom surface 62a of the partition 60 (base plate 62) are bonded to each other by welding or the like.

In this manner, channels 52 are formed by groove portions 66 formed between ribs 64 of one partition 60 and a bottom surface 62a of another partition 60 stacked on the one partition 60. Then, during use of the structure 50, fluids (gas, liquid, or multi-phase flow) flow through the channels 52. A channel 52 has a width (width in the X axis direction in FIG. 1A to FIG. 1C) of about 36 mm, for example. The channel 52 has a height (height in the Z axis direction of FIG. 1A to FIG. 1C) of about 15 mm, for example. A rib 64 of the channel 52 has a width (width in the X axis direction in FIG. 1A to FIG. 1C) of about 5 mm, for example.

As described above, various fluids flow through the channels 52 formed in the structure 50. However, when a joint failure occurs between the upper surface of the rib 64 and the bottom surface 62a of the partition 60, a fluid flowing through one channel 52 is mixed into another channel 52 to cause a problem. To address this problem, the ultrasonic flaw detection device 100 is used to inspect a joint surface (inspection surface) S between the upper surface of the rib 64 and the bottom surface 62a of the partition 60 for a joint failure.

As illustrated in FIG. 1C, the ultrasonic flaw detection device 100 includes a transmission probe 110, a reception probe 120, and a control device 130. The transmission probe 110 and the control device 130 are connected to each other by a supporting member 142. The reception probe 120 and the control device 130 are connected to each other by a supporting member 144. The transmission probe 110 and the reception probe 120 are formed to have a dimensional relationship in which each of the transmission probe 110 and the reception probe 120 can be brought into contact with a bottom surface 66a of a groove portion 66 and a side surface 64a of a rib 64 that is arranged above (immediately above) the joint surface S. The transmission probe 110 and the reception probe 120 are arranged to be in contact with the groove portions 66 (channels 52). In other words, the transmission probe 110 and the reception probe 120 are arranged such that the rib 64 above the joint surface S is sandwiched between the transmission probe 110 and the reception probe 120. Between the transmission probe 110 and the structure 50, glycerol, water, or other such substance for suppressing attenuation of an ultrasonic wave is filled. Similarly, between the reception probe 120 and the structure 50, glycerol, water, or other such substance for suppressing attenuation of the ultrasonic wave is filled.

Figure 2B:
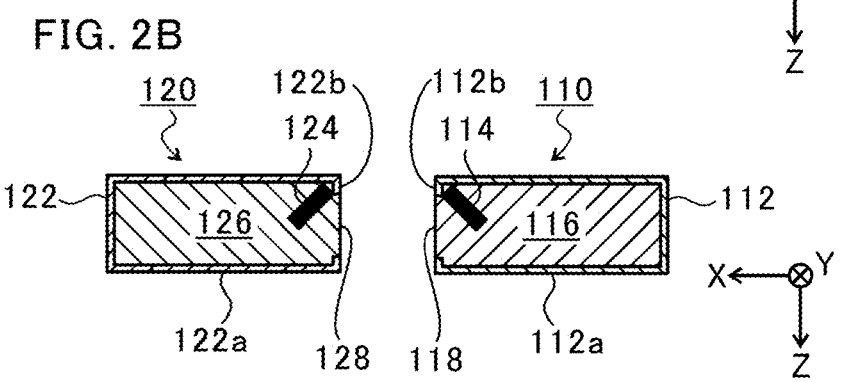
FIG. 2B is a cross-sectional view taken along the line IIb-IIb of FIG. 2A.
Figure 2C:
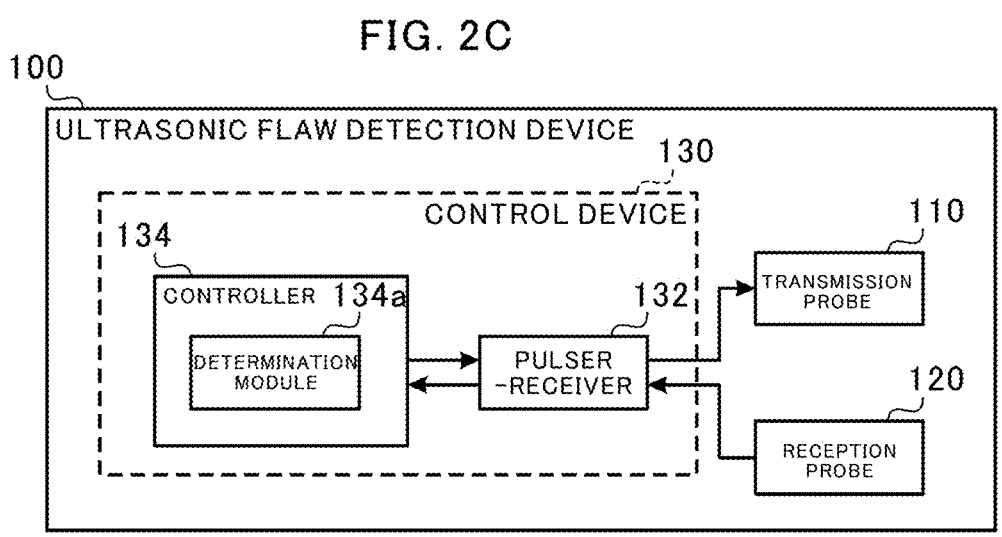
FIG. 2C is a functional block diagram of the ultrasonic flaw detection device.

FIG. 2A is a perspective view of the transmission probe 110 and the reception probe 120. FIG. 2B is a cross-sectional view taken along the line IIb-IIb of FIG. 2A. FIG. 2C is a functional block diagram of the ultrasonic flaw detection device 100. In FIG. 2C, flows of signals are indicated by the arrows.

As illustrated in FIG. 2A and FIG. 2B, the transmission probe 110 includes an enclosure 112 (made of a metal, for example), a transducer 114, and a filler 116. The transducer 114 is arranged in the enclosure 112 to transmit an ultrasonic beam. The filler 116 is filled inside the enclosure 112 to maintain propagation of the ultrasonic wave. The filler 116 contains acryl, for example. The enclosure 112 has an opposing surface portion 112a (first opposing surface portion) and a side surface portion 112b. The opposing surface portion 112a is opposed to the inspection surface, and is brought into contact with the bottom surface 66a of the channel 52 (groove portion 66). The side surface portion 112b is erected at a right angle from the opposing surface portion 112a. In the side surface portion 112b, a transmission window 118 configured to allow the ultrasonic beam to pass therethrough is formed.

Similarly to the transmission probe 110, the reception probe 120 includes an enclosure 122 (made of a metal, for example), a transducer 124, and a filler 126. The transducer 124 is arranged in the enclosure 122, and receives an ultrasonic wave to convert the received ultrasonic wave into an electrical signal. The filler 126 is filled inside the enclosure 122 to maintain propagation of the ultrasonic wave. The filler 126 contains acryl, for example. The enclosure 122 has an opposing surface portion 122a (second opposing surface portion) and a side surface portion 122b. The opposing surface portion 122a is opposed to the inspection surface, and is brought into contact with the bottom surface 66a of the channel 52 (groove portion 66). The side surface portion 122b is erected at a right angle from the opposing surface portion 122a. In the side surface portion 122b, a reception window 128 configured to allow the ultrasonic wave to pass therethrough is formed.

As illustrated in FIG. 2C, the control device 130 includes a pulser-receiver 132 and a controller 134. The pulser-receiver 132 supplies electric power to the transducer 114 of the transmission probe 110 through the supporting member 142. The pulser-receiver 132 oscillates the transducer 114 to transmit the ultrasonic beam. Moreover, the pulser-receiver 132 converts an electrical signal that has been input from the transducer 124 of the reception probe 120 through the supporting member 144 into oscillation information. The pulser-receiver 132 transmits the oscillation information to the controller 134. The oscillation information is information expressed as digital values, for example.

The controller 134 is formed of a semiconductor integrated circuit including a central processing unit (CPU). The controller 134 reads a program, a parameter, and other such data for operating the CPU itself from a read-only memory (ROM). The controller 134 manages and controls the entire ultrasonic flaw detection device 100 in cooperation with a random access memory (RAM) serving as a work area, and other such electronic circuits. The controller 134 controls the pulser-receiver 132 to cause the transmission probe 110 to transmit the ultrasonic beam. The controller 134 receives the oscillation information (information based on the ultrasonic wave received by the reception probe 120) transmitted from the pulser-receiver 132.

In this embodiment, the controller 134 also serves as a determination module 134a. The determination module 134a determines, based on the oscillation information received from the pulser-receiver 132, presence or absence of a joint failure (presence or absence of a flaw) in the inspection surface (joint surface S).

As described above, the ultrasonic flaw detection device 100 transmits the ultrasonic beam to the inspection surface (joint surface S) of the object to be inspected (structure 50). Then, the ultrasonic flaw detection device 100 receives and analyzes the ultrasonic wave that has been reflected (or diffracted/scattered) in an inspectable range. In this manner, the ultrasonic flaw detection device 100 detects a flaw in the inspectable range. To describe specifically, the ultrasonic wave has a characteristic of being reflected at a boundary of materials having different densities. Therefore, when there is a defect, for example, a flaw in the inspectable range, the ultrasonic wave is reflected at a boundary between the defect and a surrounding area. Therefore, the ultrasonic flaw detection device 100 can grasp the presence or absence of the defect, a position of the defect, a shape of the defect, and other such information by receiving and analyzing the reflected ultrasonic wave.

In this case, when a range required to be inspected is smaller than the inspectable range, the ultrasonic wave that has been reflected outside the range required to be inspected reaches the reception probe and becomes noise. Then, a reflected wave originating from the defect is buried in the noise, and it becomes difficult to detect a flaw in the range required to be inspected. The inspectable range is a range of the inspection surface in which the ultrasonic beam radiated from the transmission probe 110 enters, and from which the reflected ultrasonic wave reaches the reception probe 120.

Figure 3A:
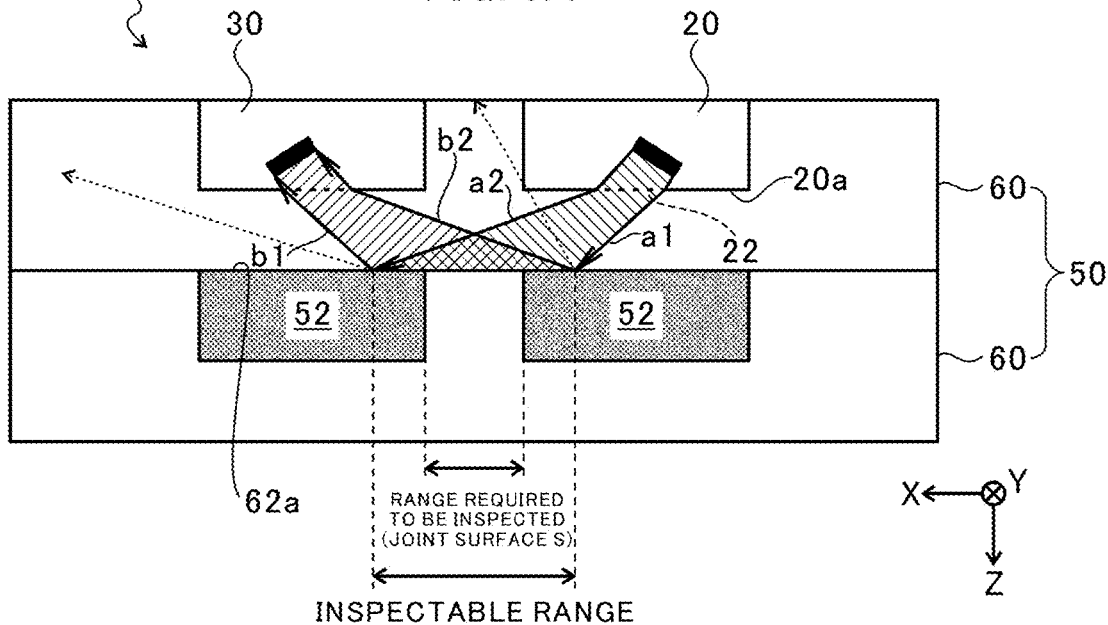
FIG. 3A is a view for illustrating an inspectable range and a range required to be inspected in a related-art ultrasonic flaw detection device.
Figure 3B:
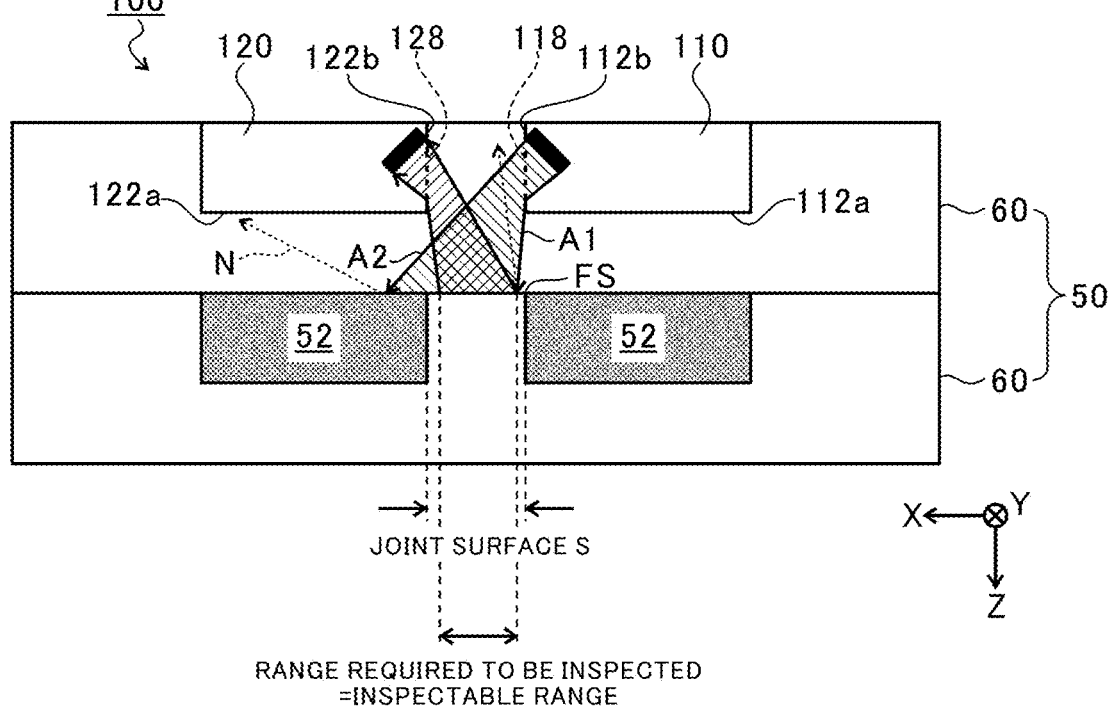
FIG. 3B is a view for illustrating an inspectable range and a range required to be inspected in the ultrasonic flaw detection device.

FIG. 3A is a view for illustrating an inspectable range and a range required to be inspected in a related-art ultrasonic flaw detection device 10. FIG. 3B is a view for illustrating an inspectable range and a range required to be inspected in the ultrasonic flaw detection device 100. In FIG. 3A and FIG. 3B, in order to facilitate understanding, the channels 52 are illustrated by being filled in with gray, and the ultrasonic beam and the reflected ultrasonic wave are illustrated by being hatched.

As illustrated in FIG. 3A, in the related-art ultrasonic flaw detection device 10, a transmission window 22 is provided in an opposing surface portion 20a of a transmission probe 20. The ultrasonic beam that has been transmitted through the transmission window 22 travels in a straight line in a direction of incidence (transmission direction) while increasing its beam width (in FIG. 3A, edges of the ultrasonic beam are indicated by arrows a1 and a2). In this case, a transducer that transmits the ultrasonic wave has a certain size. Therefore, the beam width of the ultrasonic beam is large to a certain extent. Therefore, when the range required to be inspected (joint surface S) is as small as about 5 mm, the range required to be inspected is narrower than the inspectable range. Then, a reception probe 30 disadvantageously receives (acquires) an ultrasonic wave that has been reflected outside the range required to be inspected (in a range that is larger than outer edges of the range required to be inspected) (in FIG. 3A, edges of the reflected ultrasonic wave are indicated by arrows b1 and b2).

To address this problem, in the ultrasonic flaw detection device 100 according to this embodiment, the transmission probe 110 and the reception probe 120 are arranged such that an angle of the transmission window 118 with respect to the inspection surface and an angle of the reception window 128 with respect to the inspection surface have a relationship in which an ultrasonic wave that has been reflected outside the range required to be inspected does not reach the reception window 128.

To describe specifically, as illustrated in FIG. 3B, the transmission window 118 is provided in the side surface portion 112b that is erected at the right angle from the opposing surface portion 112a (surface that is opposed to the inspection surface). Moreover, the reception window 128 is provided in the side surface portion 122b that is erected at the right angle from the opposing surface portion 122a (surface that is opposed to the inspection surface). Further, the transmission probe 110 and the reception probe 120 are arranged such that a distance between the transmission window 118 and the reception window 128 is slightly larger than a width (in FIG. 3A and FIG. 3B, width in the X axis direction) of the range required to be inspected.

As a result, an edge A1 on the transmission probe 110 side of the ultrasonic beam, which has been transmitted from the transmission window 118, is restricted in a direction of incidence by the side surface portion 112b. Therefore, there can be avoided an event in which the ultrasonic beam enters the opposing surface portion 112a side of the side surface portion 112b. Moreover, the edge A1 of the ultrasonic beam reaches the inside of an edge FS on the transmission probe 110 side of the range required to be inspected. Therefore, there can be avoided an event in which a reflected wave is generated by the channel 52 that is located below the opposing surface portion 112a.

Meanwhile, there is no obstacle that restricts an edge A2 on the reception probe 120 side of the ultrasonic beam, which has been transmitted from the transmission window 118, in the direction of incidence. Therefore, the ultrasonic beam, which has been transmitted from the transmission window 118, enters also on the reception probe 120 side of (outside) the range required to be inspected. Therefore, a reflected wave is generated in a range of from the edge A1 to the edge A2 of the ultrasonic beam (range of the beam width). In other words, a reflected wave is generated not only in the range required to be inspected but also by the channel 52 on the reception probe 120 side.

However, the reception window 128 in this embodiment is provided not in the opposing surface portion 122a but in the side surface portion 122b. Therefore, the reception window 128 does not receive the reflected wave (indicated by N in FIG. 3B) that reaches the opposing surface portion 122a of the reception probe 120. Therefore, there can be avoided the event in which the reflected wave generated by the channel 52 on the reception probe 120 side disadvantageously reaches the reception window 128. As a result, the noise originating from the channel 52 can be removed. In this manner, only the reflected wave that is generated in the range required to be inspected reaches the reception window 128, and the flaw can be detected accurately in the range required to be inspected.

<Ultrasonic Flaw Detection Method>

Figure 4:
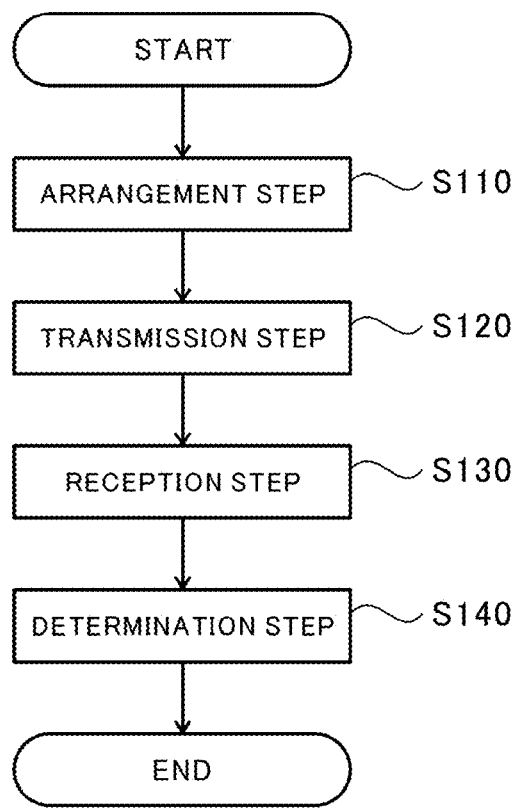
FIG. 4 is a flow chart for illustrating a flow of processing performed by an ultrasonic flaw detection method according to an embodiment of this disclosure.

Next, a flow of processing performed by an ultrasonic flaw detection method using the ultrasonic flaw detection device 100 is described. FIG. 4 is a flow chart for illustrating the flow of the processing performed by the ultrasonic flaw detection method. As illustrated in FIG. 4, first, the transmission probe 110 and the reception probe 120 are arranged such that the angle of the transmission window 118 with respect to the inspection surface (joint surface S) and the angle of the reception window 128 with respect to the inspection surface (joint surface S) have the relationship in which the ultrasonic wave that has been reflected outside the range required to be inspected does not reach the reception window 128 (arrangement step S110). Then, the controller 134 controls the pulser-receiver 132 to cause the transmission probe 110 to transmit the ultrasonic beam from the transmission window 118 toward the range required to be inspected (transmission step S120). In this manner, the ultrasonic beam enters the object to be inspected, and the reflected wave (or diffracted wave/scattered wave) is generated in the range required to be inspected.

Then, the reception probe 120 converts oscillation based on the ultrasonic wave that has been received through the reception window 128 into an electrical signal, and outputs the electrical signal to the pulser-receiver 132 (reception step S130). The pulser-receiver 132 converts the electrical signal, which has been input from the reception probe 120, into the oscillation information, and transmits the oscillation information to the controller 134. Then, the determination module 134a of the controller 134 determines, based on the oscillation information transmitted from the pulser-receiver 132, the presence or absence of a flaw in the range required to be inspected (determination step S140).

As described above, according to the ultrasonic flaw detection device 100 of this embodiment and the ultrasonic flaw detection method using the ultrasonic flaw detection device 100, a flaw can be detected in the range required to be inspected with high accuracy while suppressing occurrence of noise.

First Modification Example

Figure 5:
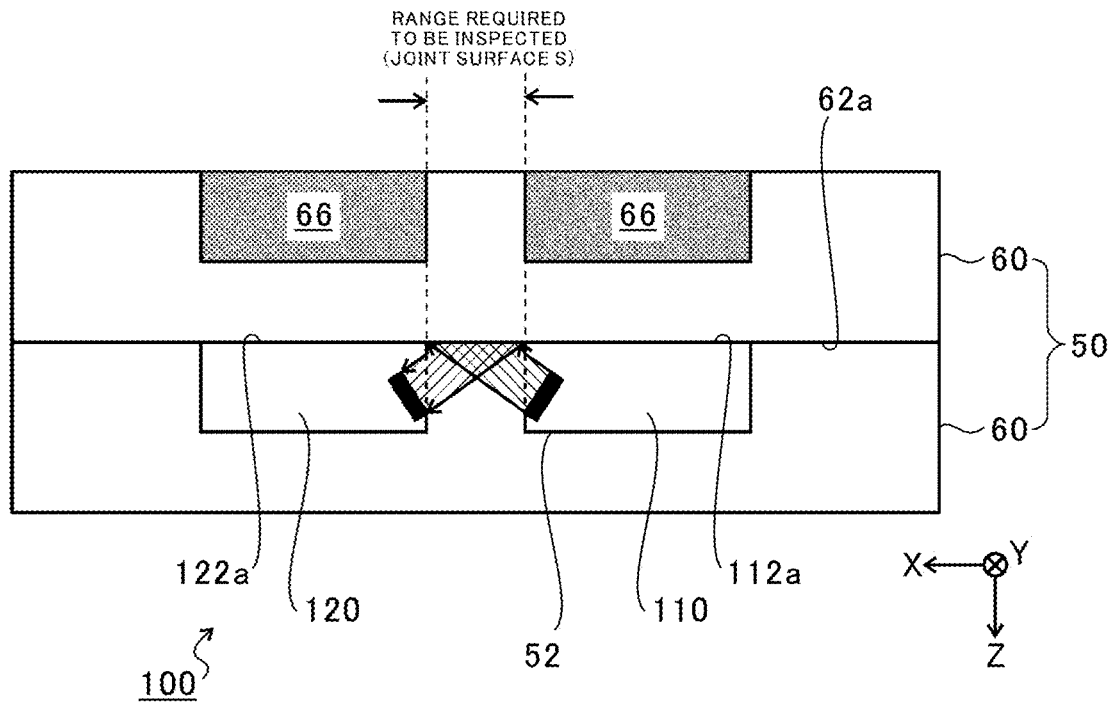
FIG. 5 is a view for illustrating an ultrasonic flaw detection device according to a first modification example of this disclosure.

FIG. 5 is a view for illustrating an ultrasonic flaw detection device 100 of a first modification example. In FIG. 5, in order to facilitate understanding, the groove portions 66 are illustrated by being filled in with gray, and the ultrasonic beam and the reflected ultrasonic wave are illustrated by being hatched.

In the above embodiments, there has been described as an example the structure in which the opposing surface portion 112a of the transmission probe 110 and the opposing surface portion 122a of the reception probe 120 are brought into contact with the bottom surfaces 66a of the channels 52 to detect a flaw. However, as illustrated in FIG. 5, the ultrasonic flaw detection device 100 may detect a flaw in the joint surface S by bringing the opposing surface portion 112a of the transmission probe 110 and the opposing surface portion 122a of the reception probe 120 into contact with upper surfaces of the channels 52. In other words, the ultrasonic flaw detection device 100 may detect a flaw in the joint surface S by bringing the opposing surface portion 112a and the opposing surface portion 122a into contact with the bottom surface 62a of the partition 60.

Second Modification Example

Figure 6A:
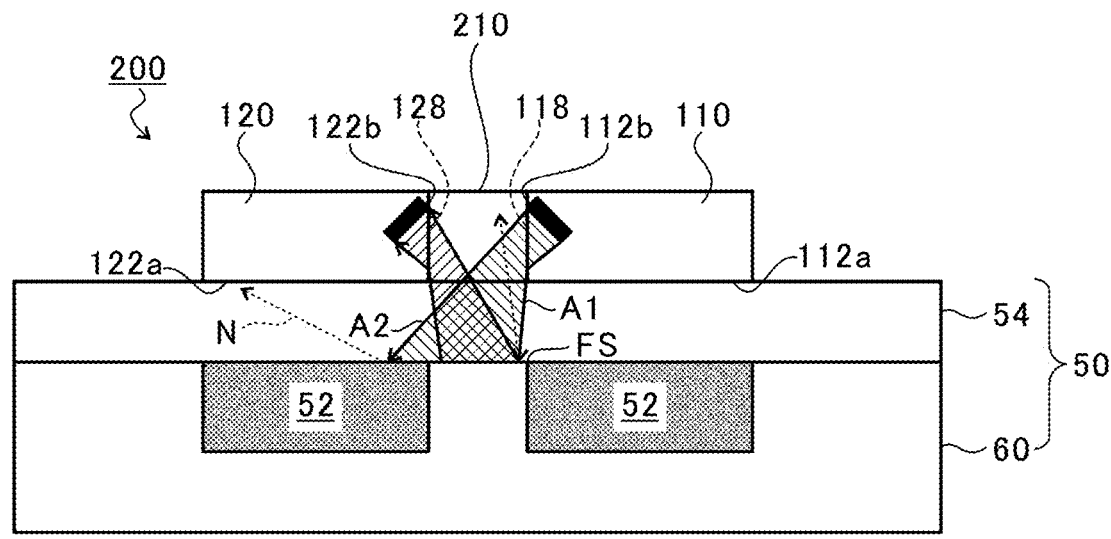
FIG. 6A is a first view for illustrating an ultrasonic flaw detection device according to a second modification example of this disclosure.
Figure 6B:
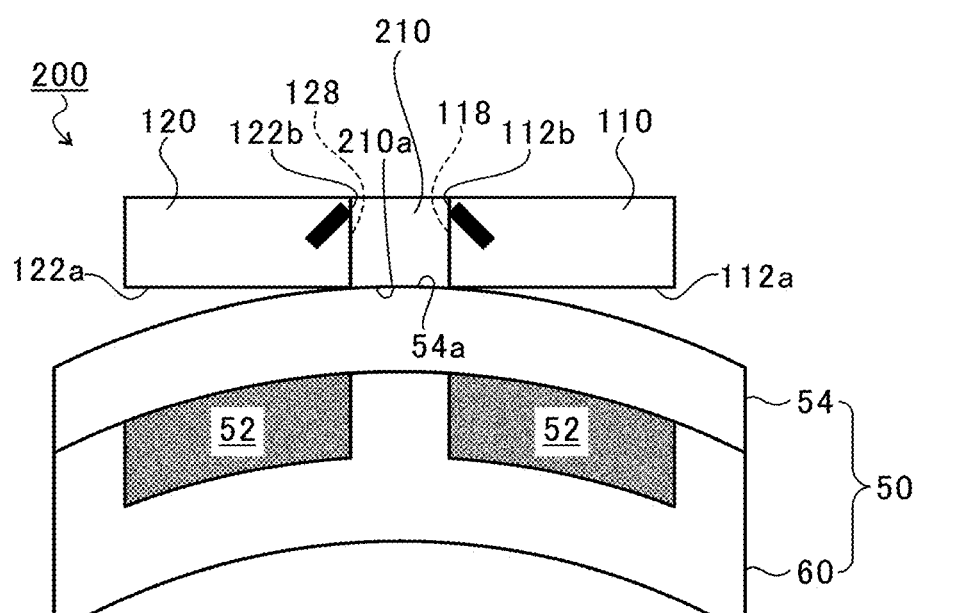
FIG. 6B is a second view for illustrating the ultrasonic flaw detection device according to the second modification example.

FIG. 6A is a first view for illustrating an ultrasonic flaw detection device 200 of a second modification example of this disclosure. FIG. 6B is a second view for illustrating the ultrasonic flaw detection device 200 of the second modification example. In FIG. 6A and FIG. 6B, in order to facilitate understanding, the groove portions 52 are illustrated by being filled in with gray, and the ultrasonic beam and the reflected ultrasonic wave are illustrated by being hatched.

As described above, the ultrasonic wave is reflected at the boundary between the materials having different densities. Therefore, when there is an air gap between the transmission window 118 and the reception window 128, the ultrasonic beam is disadvantageously reflected at a boundary between the transmission window 118 and the air gap. Then, the transmission probe 110 cannot allow the ultrasonic beam to enter the range required to be inspected. In the above embodiment, the rib 64 that can be sandwiched between the transmission window 118 and the reception window 128 is provided on the object to be inspected. Therefore, the rib 64 can be interposed (the object to be inspected is at least partially used as a medium portion) between the transmission window 118 and the reception window 128. Therefore, in the above embodiment, there has been described, as an example, the structure in which the ultrasonic beam passes through the rib 64 to enter the range required to be inspected. However, as illustrated in FIG. 6A and FIG. 6B, the object to be inspected, for example, a cover portion 54 of the structure 50, does not necessarily have the shape in which the object to be inspected is partially interposed between the transmission window 118 and the reception window 128.

Therefore, as illustrated in FIG. 6A and FIG. 6B, the ultrasonic flaw detection device 200 in the second modification example includes a medium portion 210 in addition to the transmission probe 110, the reception probe 120, and the control device 130 (not shown in this example). Components that have been described in the above embodiment are denoted by the same reference symbols, and a description thereof is omitted.

The medium portion 210 is formed of a material through which the ultrasonic wave is propagated, and is provided between the transmission window 118 and the reception window 128. With the structure including the medium portion 210, a flaw can be detected irrespective of a shape of the object to be inspected.

The medium portion 210 is not limited in terms of the material as long as the ultrasonic wave can be propagated therethrough. However, it may be formed of substantially the same material as that of the object to be inspected, or a material having a density that is substantially equal to that of the object to be inspected. As a result, a reflected wave that is generated at a boundary between the medium portion 210 and the object to be inspected can be suppressed.

Moreover, as illustrated in FIG. 6B, it may be that a contact surface portion 210a of the medium portion 210 that is brought into contact with the object to be inspected have a shape corresponding to a surface 54a to be contacted of the object to be inspected. With this structure, a contact area between the medium portion 210 and the object to be inspected can be increased. As a result, an air gap that is formed between the medium portion 210 and the object to be inspected can be reduced. Therefore, the ultrasonic flaw detection device 200 can efficiently allow the ultrasonic beam to enter the range required to be inspected.

The embodiment of this disclosure has been described above with reference to the attached drawings, but it is to be understood that this disclosure is not limited to the above-mentioned embodiment. It is apparent that those skilled in the art may arrive at various alternations and modifications within the appended claims, and those examples are understood as naturally falling within the technical scope of this disclosure.

For example, in the above embodiment, there has been described, as an example, the structure in which the angle of the transmission window 118 with respect to the inspection surface and the angle of the reception window 128 with respect to the inspection surface are each 90° (right angle). However, the angle of the transmission window 118 with respect to the inspection surface and the angle of the reception window 128 with respect to the inspection surface are not limited. The angle of the transmission window 118 with respect to the inspection surface and the angle of the reception window 128 with respect to the inspection surface may each be 45° or 65°, for example.

Moreover, in the above embodiment, there has been described, as an example, the structure in which the range required to be inspected and the width of the rib 64 are substantially equal to each other. Therefore, the ultrasonic flaw detection device 100 has been able to maintain the distance between the transmission window 118 and the reception window 128 at a distance with which the ultrasonic wave that has been reflected outside the range required to be inspected does not reach the reception window 128 by merely sandwiching the rib 64 between the transmission probe 110 and the reception probe 120. However, the ultrasonic flaw detection device 100 may adjust the distance between the transmission probe 110 and the reception probe 120 to adjust the range required to be inspected.

Moreover, in the above embodiment, there has been described, as an example, the structure in which the ultrasonic flaw detection device 100 includes the determination module 134a. However, even when independently formed as hardware without including the determination module 134a, but when connected to an existing determination module, the ultrasonic flaw detection device 100 can detect a flaw in the object to be inspected.

INDUSTRIAL APPLICABILITY

This disclosure can be used for the ultrasonic flaw detection device, which is configured to detect a flaw in the object to be inspected using the ultrasonic wave, and for the ultrasonic flaw detection method.

What is claimed is:

1. An ultrasonic flaw detection device, comprising:
   a transmission window;
   a transmission probe, which is configured to transmit an ultrasonic beam from the transmission window toward a range required to be inspected, which is set in advance, of an inspection surface of an object to be inspected;
   a reception window, which is arranged in a relationship with respect to the transmission window in which an ultrasonic wave that has been reflected outside the range required to be inspected is inhibited from reaching the reception window; and
   a reception probe, which is configured to receive an ultrasonic wave that has passed through the reception window;
   wherein the transmission probe is formed so that an edge of the ultrasonic beam has an angle at which the edge of the ultrasonic beam reaches an edge on the transmission probe side of the range required to be inspected or an inside of the edge on the transmission probe side of the range required to be inspected,
   the transmission window and the reception window have angles with respect to the inspection surface that establish the relationship in which the ultrasonic wave that has been reflected outside the range required to be inspected is inhibited from reaching the reception window,
   the transmission probe has a first opposing surface portion that is opposed to the inspection surface, and the transmission window is provided in a side surface portion that is erected at a right angle from the first opposing surface portion, and
   the reception probe has a second opposing surface portion that is opposed to the inspection surface, and the reception window is provided in a side surface portion that is erected at a right angle from the second opposing surface portion.

2. The ultrasonic flaw detection device according to claim 1, further comprising a medium portion, which is provided between the transmission window and the reception window, and through which an ultrasonic wave is to be propagated.

3. The ultrasonic flaw detection device according to claim 2, wherein the object to be inspected is at least partially used as the medium portion, and wherein the object to be inspected comprises first and second partitions, the second partition is stacked on the first partition, the first partition comprises a first rib, the second partition comprises a second rib, the inspection surface is a joint surface between an upper surface of the first rib of the first partition and a bottom surface of the second partition stacked on the first partition, the second rib of the second partition is provided between the transmission window and the reception window, and the transmission window and the reception window are in contact with the second rib of the second partition.

4. The ultrasonic flaw detection device according to claim 1, further comprising a determination module, which is configured to determine presence or absence of a flaw in the range required to be inspected based on the ultrasonic wave received by the reception probe.

5. An ultrasonic flaw detection method, in which an ultrasonic flaw detection device is used to detect a flaw in a range required to be inspected, which is set in advance, of an inspection surface of an object to be inspected, the ultrasonic flaw detection device including a transmission probe configured to transmit an ultrasonic beam from a transmission window, and a reception probe configured to receive an ultrasonic wave that has passed through a reception window, the ultrasonic flaw detection method comprising:

arranging the transmission probe and the reception probe so that the transmission window and the reception window have a relationship in which an ultrasonic wave that has been reflected outside the range required to be inspected is inhibited from reaching the reception window; and causing the transmission probe to transmit the ultrasonic beam from the transmission window toward the range required to be inspected;

wherein the transmission probe is formed so that an edge of the ultrasonic beam has an angle at which the edge of the ultrasonic beam reaches an edge on the transmission probe side of the range required to be inspected or an inside of the edge on the transmission probe side of the range required to be inspected, the transmission window and the reception window have angles with respect to the inspection surface that establish the relationship in which the ultrasonic wave that has been reflected outside the range required to be inspected is inhibited from reaching the reception window, the transmission probe has a first opposing surface portion that is opposed to the inspection surface, and the transmission window is provided in a side surface portion that is erected at a right angle from the first opposing surface portion, and the reception probe has a second opposing surface portion that is opposed to the inspection surface, and the reception window is provided in a side surface portion that is erected at a right angle from the second opposing surface portion.

* * * * *